April 13, 1926.
P. DUPUY
1,580,817
PNEUMATIC SUSPENSION FED BY COMPRESSED AIR
Filed Feb. 14, 1924     2 Sheets-Sheet 1
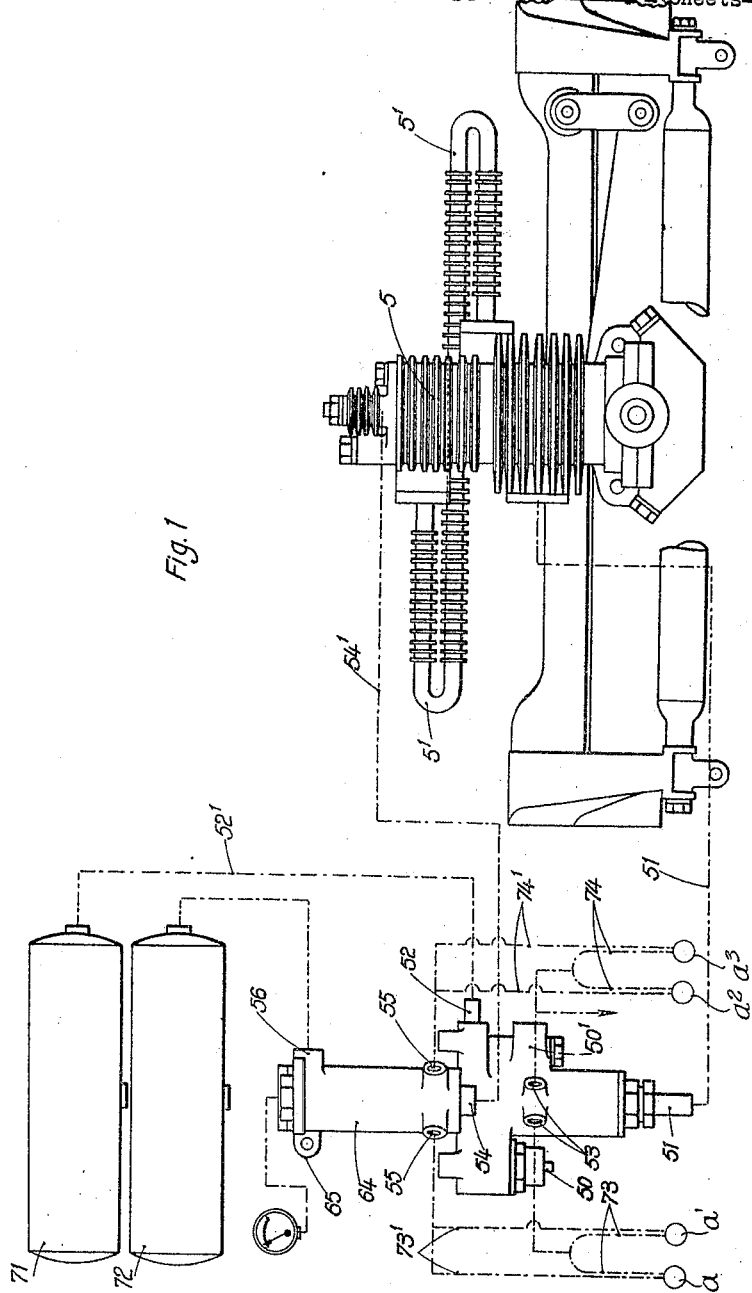
INVENTOR
PIERRE DUPUY.
By O'Neill and Bunn
ATTORNEYS April 13, 1926. 1,580,817
P. DUPUY
PNEUMATIC SUSPENSION FED BY COMPRESSED AIR
Filed Feb. 14, 1924  2 Sheets-Sheet 2
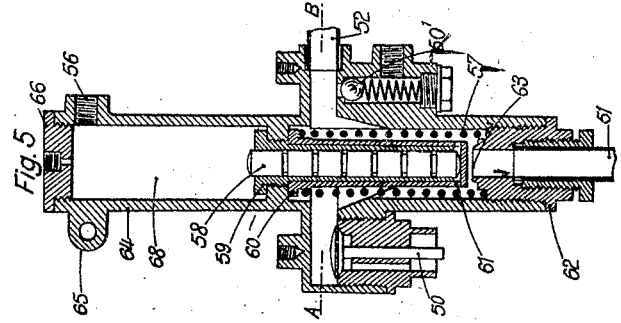
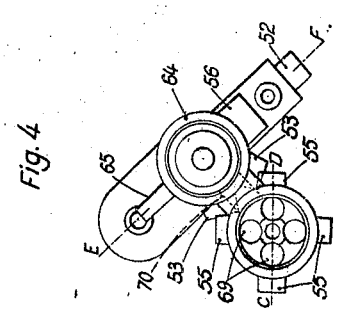
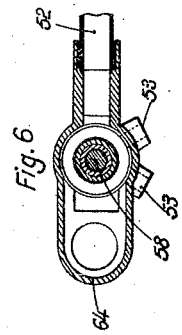
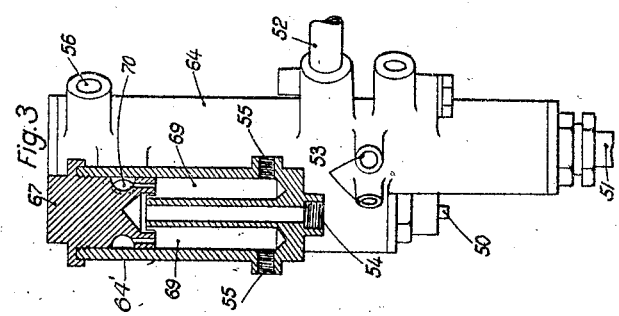
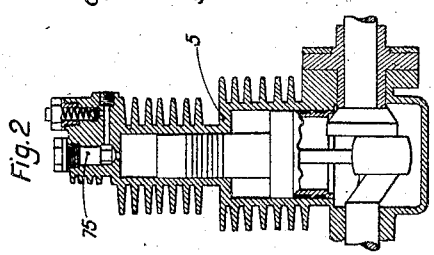
INVENTOR
PIERRE DUPUY.
By O'Neill and Bunn
ATTORNEYS.

Patented Apr. 13, 1926.

1,580,817

UNITED STATES PATENT OFFICE.

PIERRE DUPUY, OF PARIS, FRANCE.

PNEUMATIC SUSPENSION FED BY COMPRESSED AIR.

Application filed February 14, 1924. Serial No. 692,768.

*To all whom it may concern:*

Be it known that I, PIERRE DUPUY, engineer, citizen of the French Republic, residing at Paris, Department of the Seine, in France, and having P. O. address 12 Avenue d'Eylau, in said city, have invented certain new and useful Improvements in Pneumatic Suspensions Fed by Compressed Air; and I do hereby declare the following to be a full, clear, and exact description of the invention, such as will enable others skilled in the art to which it appertains to make and use the same.

This invention relates to improved means for regulating the supply of compressed air and oil to the cylinders of pneumatic suspension devices for vehicles, and has for its object to provide regulating devices to insure a continuous circulation of the air and oil between the compressor and the several suspension devices. In suspension systems of this general character there is provided a regulating leak of air and oil from the cylinders of the suspension devices, so that the systems waste relatively large quantities of compressed air and considerable amounts of the lubricant, the latter escaping past the usual packing means between the cylinder and piston of the individual suspension devices, and also being entrained and carried away by the escaping compressed air. The instant invention is designed to provide means to materially reduce the waste of oil and air, and to permit the apparatus to be operated under high pressures, thereby permitting the cylinders of the suspension system being reduced in size, resulting in a material saving in the first cost, and also effecting material economies in the energy required to operate the system and the quantity of oil required to lubricate the same.

The invention is illustrated in the accompanying drawings, in which:

Fig. 1 is a view partly in diagram of the complete system.

Fig. 2 is a vertical sectional elevation of the compressor.

Fig. 3 is an elevation, partly in section, on line C—D Fig. 4, of the regulating device.

Fig. 4 is a plan view of the regulating device.

Fig. 5 is a vertical section on line E—F Fig. 4.

Fig. 6 is a horizontal section on line A—B, Fig. 5.

In pneumatic suspension systems of this general type it is customary to employ four cylinders and cooperating pistons connected to the vehicle in lieu of or as ancillary to the usual springs, each suspension unit being provided with a leak opening to permit the escape of the compressed air when the piston reaches a predetermined position within its cylinder, the leak opening constituting, in effect, an exhaust which prevents too great relative movement between the piston and the cylinder. Such a suspension system is schematically indicated by the four cylinders $a$, $a'$, $a^2$ and $a^3$. The leak openings are exhausts and are connected to pipes 73 and 74 respectively, pipes 73' and 74' supplying the air under pressure to the several cylinders.

The compressed air to operate the several pneumatic suspension devices is supplied by a two-stage compressor 5, the cylinders of which are connected by pipe 5', the suction of the compressor being connected to pipe 51, and the discharge of the compressor connected to pipe 54', and interposed between the supply pipe 51 and the discharge pipe 54 of the compressor is the regulating apparatus constituting the instant invention, and designed primarily to conserve energy required to supply the compressed air and also prevent the waste of lubricant and effectively distribute the lubricant to the suspension devices and the compressor, by insuring a close circulation of air and entrained lubricant between the compressor and the suspension devices.

The regulator per se comprises a casing 64 including an upper chamber 68 provided with lugs 65 for attaching the device to the dashboard of a vehicle or other suitable support, the upper part of the chamber being closed by screw plug 66 adjacent which is a discharge opening 56 connected by piping with a pressure reservoir 72. The lower end of the casing 64 is closed by a hollow screw plug 62 having a valve seat 63 on its inner end, said plug 62 being connected to the suction pipe 51 of the compressor by means of a suitable gland or stuffing box. A lateral extension of the casing 64 is provided with a valve 50, by means of which atmospheric air is admitted to the casing and delivered, under certain conditions, to the intake pipe 51 of the compressor. The casing is also provided with a lateral extension containing a spring-pressed exhaust valve 50', which is operated to permit the escape of excessive pneumatic pressure in the system, said extension also being connected to an exhaust reservoir 71 by pipe 52'. Formed on the lower part of the casing 64 are nipples 53, which are connected to the pipes 73 and 74, which constitute the leaks or exhausts for the cylinders of the suspension devices, so that the oil and air exhausted from the suspension devices passes directly to and through the casing by pipes 73 and 74, nipples 53 and pipe 52' to the exhaust tank 71.

Formed integrally with the casing 64 and laterally of the latter, is an auxiliary casing 64' closed at its top by a screw plug 67 and communicating with chamber 68 by a duct 70. The interior of the auxiliary chamber 64 is provided with a central duct 54 connected to the discharge pipe 54' from the compressor, and with lateral chambers 69 which are connected to the supply pipes 73' and 74' of the suspension devices by inlet nipples 55, by means of which air and oil are supplied to said suspension devices.

Secured in the casing 64 is a cylinder 59 open at both ends, in which operates a loose piston 58. Surrounding the cylinder 59 is a cylindrical member 60 provided at its lower end with vents or ports 61 near the bottom thereof, said bottom portion of the cylindrical member 60 being adapted to engage the valve seat 63 in the plug 62, under certain conditions of operation, and thereby shut off the air supply to the compressor through pipe 51. Surrounding the cylindrical member 60 is a calibrated helical spring 57 which serves to hold the cylindrical member in its upper position, so that the bottom thereof is out of engagement with the valve seat 63. The lower end of the piston 58 normally engages the bottom of the cylindrical member so that the pneumatic pressure operating on the upper end of the piston 58, normally tends to force said piston and the cylindrical member 60 downward against the tension of the spring 57. When the pressure in the chamber 68 is sufficient to overcome the spring 57, the cylindrical member 60 is forced downwardly by the piston and shuts off the supply of atmospheric air from valve 50 to the suction side of the compressor by way of pipe 51.

The chambers 64' and 68 are filled with oil by removing the screw plug 67, the oil overflowing from chamber 64' into chamber 68 through the connecting orifice 70. After these chambers have been filled with oil the screw plug is replaced and the apparatus is in condition for operation.

When the compressor is started atmospheric air is drawn in through valve 50 and passes directly through the lower part of casing 64 past valve seat 63 and through pipe 51 to the intake port of the compressor 5. Compressed air is delivered from the output end of the compressor by pipe 54' to the axial duct 54 of the auxiliary casing 64', thence to the lateral chambers 69 and the several discharge nipples 55, through the pressure supply pipe 73' and 74' to the cylinders $a$, $a'$, $a^2$ and $a^3$ of the several suspension devices. The compressed air also passes from the auxiliary chamber 64' into the top of chamber 64 by way of opening 70, and from said chamber 68 into the pressure reservoir 72 by way of discharge nipple 56 and the piping connecting the latter with said reservoir, the compressed air forcing oil in the several compartments 69 of the auxiliary chamber 64 into the several suspension devices, for the purpose of lubricating the latter. The compressed air entering the chamber 68 above the oil therein, causes the oil to exercise corresponding pressure upon the upper end of the piston 58, tending to force the latter and the cylindrical member 60 downward. This air pressure also forces a portion of the oil past the piston 58 and through the vents or ports 61 in the lower part of the cylindrical member where the oil is taken up by the air entering the casing by way of valve 50, and delivers this portion of the oil to the compressor for the purpose of lubricating the latter. When the air pressure delivered by the compressor reaches the desired maximum, which is determined by the tension of spring 57, the piston 48 forces the cylindrical member 60 downward to engage the valve seat 63 and shut off the supply of atmospheric air to the compressor, by way of valve 50. The oil delivered to the compressor and serving to lubricate the same, is atomized and forced out of the compressor with the air, through pipe 54' to the intake 54 of auxiliary chamber 64', whence the atomized oil is delivered in part to the suspension devices and to chamber 68 so that it is used continuously for lubricating the suspension devices and the compressor. The system operates under the conditions explained until the suspension devices exhaust through pipes 73 and 74 into the lower part of the casing 64, and thence into the exhaust reservoir 71. When the exhaust pressure exceeds the amount of suction induced by the compressor, the valve 50 closes and the pressure rises in the apparatus, relief valve 50' opens. As soon as the valve 50 is closed, the compressor is fed directly from the exhaust of the suspension devices, including the exhaust tank 71, as the predominance of the exhaust pressure has permitted spring 57 to elevate the cylindrical member 60 and the piston 58 and uncover valve seat 63, thereby opening direct communication between the intake pipe 51 of the compressor and the exhaust tank 71. It will be understood that the relief valve 50' operates only to relieve excess pressure in the system. It will be noted that, when the compressor is operating to draw in atmospheric air through the valve 50, or during the closed cycle taking the non-expanding compressed air of the exhaust, the oil is entrained in the air and caused to circulate in the closed cycle so that the loss of oil is reduced to a minimum. It will also be noted that the oil supplied to the suspension devices is, in part, returned to the lower part of the casing 64 when the suspension devices exhaust, under which condition this returned portion of the oil is delivered to the compressor and is taken up in the closed circulation as explained.

What I claim is:

1. Apparatus for regulating the supply of compressed air and oil to the cylinders of pneumatic suspension systems, comprising a casing adapted to be connected to the inlet and discharge pipes of a compressor, an internal fixed cylinder in said casing, a piston in said cylinder, said cylinder and piston dividing the casing into high pressure and low pressure chambers, a cylinder slidable on the fixed cylinder engaged by said piston and adapted to open and close the inlet connection to the compressor, and a calibrated spring cooperating with the slidable cylinder normally maintaining said cylinder in retracted position, and yielding to permit the slidable cylinder to close the inlet connection to the compressor when the air pressure in the high pressure chamber equals the spring tension.

2. Apparatus for regulating the supply of compressed air and oil to the cylinders of pneumatic suspension systems, comprising a casing adapted to be connected to the inlet and discharge pipes of a compressor and having a valved inlet communicating with the atmosphere, an internal fixed cylinder in said casing, a piston in said cylinder, said cylinder and piston dividing the casing into high pressure and low pressure chambers, a cylinder slidable on the fixed cylinder engaged by said piston and adapted to open and close the inlet connection to the compressor, and a calibrated spring cooperating with the slidable cylinder normally maintaining said cylinder in retracted position, and yielding to permit the slidable cylinder to close the inlet connection to the compressor when the air pressure in the high pressure chamber equals the spring tension.

3. Apparatus for regulating the supply of compressed air and oil to the cylinders of pneumatic suspension systems comprising a casing having means for connecting it with the inlet of a compressor, an internal fixed cylinder in said casing, a piston in said cylinder, said cylinder and piston dividing the casing into high pressure and low pressure chambers, a cylinder slidable on the fixed cylinder engaged by said piston and adapted to open and close the inlet connection to the compressor, a calibrated spring normally holding the slidable cylinder in retracted position and permitting said cylinder to close the inlet connection to the compressor when the air pressure in the high pressure chamber equals the spring tension, an auxiliary casing connected to the high pressure chamber of the first casing and having means at its lower end for connecting it with the outlet pipe of the compressor, and means for connecting it with the supply pipes of the suspension devices.

4. Apparatus for regulating the supply of compressed air and oil to the cylinders of pneumatic suspension systems comprising a casing having means for connecting it with the inlet of a compressor, an internal fixed cylinder in said casing, a piston in said cylinder, said cylinder and piston dividing the casing into high pressure and low pressure chambers, a cylinder slidable on the fixed cylinder engaged by said piston and adapted to open and close the inlet connection to the compressor, a calibrated spring normally holding the slidable cylinder in retracted position and permitting said cylinder to close the inlet connection to the compressor when the air pressure in the high pressure chamber equals the spring tension, an auxiliary casing connected to the high pressure chamber of the first casing and having means at its lower end for connecting it with the outlet pipes of the compressor, means for connecting it with the supply pipes of the suspension devices, and means for connecting the low pressure chamber of the first cylinder with the exhaust from the suspension devices.

In testimony whereof I affix my signature.

PIERRE DUPUY.